US006760202B1

(12) United States Patent
Meyer et al.

(10) Patent No.: US 6,760,202 B1
(45) Date of Patent: Jul. 6, 2004

(54) ELECTRICAL COIL MODULE, AN ELECTRICAL COIL COMPRISING SUCH MODULES, AND ACTUATION MECHANISM INCLUDING SUCH A COIL AND A CIRCUIT BREAKER COMPRISING SUCH AN ACTUATION MECHANISM

(76) Inventors: Jean-Marc Meyer, 28, Avenue de la Rochelle, Prilly, CH-1008 (CH); Henri Duffour, La Plantaz, Feternes, F-74500 (FR); Serge Martin, 6, Rue des Vernes, Meyrin, CH-1217 (CH)

( * ) Notice: Subject to any disclaimer, the term of this patent is extended or adjusted under 35 U.S.C. 154(b) by 0 days.

(21) Appl. No.: 09/936,261

(22) PCT Filed: Mar. 8, 2000

(86) PCT No.: PCT/EP00/00789

§ 371 (c)(1), (2), (4) Date: Dec. 26, 2001

(87) PCT Pub. No.: WO00/54292

PCT Pub. Date: Sep. 14, 2000

(30) Foreign Application Priority Data

Mar. 8, 1999 (SE) .............................................. 9900852

(51) Int. Cl.$^{7}$ .................................................. H02H 3/00

(52) U.S. Cl. ........................... 361/2; 361/115; 361/117; 361/92; 361/98; 361/45

(58) Field of Search ............................ 361/2, 115, 132, 361/92, 45, 98, 93.1, 96, 117, 54, 55, 156, 194, 42, 160, 79, 652–658, 63

(56) References Cited

U.S. PATENT DOCUMENTS

| | | | |
|---|---|---|---|
| 3,737,819 A | | 6/1973 | Thuries et al. |
| 4,631,508 A | | 12/1986 | Cinquin et al. |
| 4,728,390 A | | 3/1988 | Yamamoto et al. |
| 4,760,294 A | | 7/1988 | Hansen |
| 4,920,448 A | | 4/1990 | Bonhomme |
| 4,956,738 A | | 9/1990 | Defosse et al. |
| 5,319,342 A | | 6/1994 | Kuroki |
| 5,726,615 A | | 3/1998 | Bloom |
| 5,825,598 A | * | 10/1998 | Dickens et al. |

FOREIGN PATENT DOCUMENTS

| | | |
|---|---|---|
| DE | 23 56 516 A | 5/1975 |
| EP | 0 147 036 A1 | 7/1985 |
| EP | 0 371 157 A1 | 6/1990 |
| EP | 0 661 722 A1 | 7/1995 |
| EP | 0 771 012 A2 | 5/1997 |
| FR | 1 400 674 | 9/1965 |
| GB | 2 163 603 A | 2/1986 |
| JP | A 6-215951 | 8/1994 |
| WO | 97/212321 | 6/1997 |

* cited by examiner

*Primary Examiner*—Dean A. Reichard
*Assistant Examiner*—Nguyen T. Ha
(74) *Attorney, Agent, or Firm*—Young & Thompson

(57) ABSTRACT

An electrical coil module of planar type manufactured by printed circuit techniques on a generally flat substrate (21) has a first layout (20) of conducing material constituting a first electrical conductor having an input terminal (23), arranged on one side of the substrate (21). A second layout (20') of conducting material constituting a second electrical conductor having an output terminal (24), is arranged on the opposite side of the substrate. The first and second conductors are connected by an electrical connection (22) through the substrate (21), so that an electrical voltage connected between the input and output terminals of the coil module will drive a current from one terminal through the conductor on one side of the substrate via connection (22) through the substrate and the conductor on the other side of the substrate to the other terminal.

20 Claims, 5 Drawing Sheets

ELECTRICAL COIL MODULE, AN ELECTRICAL COIL COMPRISING SUCH MODULES, AND ACTUATION MECHANISM INCLUDING SUCH A COIL AND A CIRCUIT BREAKER COMPRISING SUCH AN ACTUATION MECHANISM

TECHNICAL FIELD

This invention relates to an electrical coil module, an electrical coil comprising such modules, an actuation mechanism including such a coil an a circuit breaker comprising such an actuation mechanism. The present actuation mechanism is preferably used in circuit breakers especially for protection of DC installations such as traction networks including the rail vehicles. The circuit breaker is typically used for limiting current in case of short circuit somewhere In the installation. It has, however, also numerous other industrial applications.

A hybrid breaker stands for a circuit breaker making use of the successive action of a very fast mechanical system and a static circuit breaker.

BACKGROUND ART

It Is possible to distinguish three different categories of circuit breakers for DC.

The electromechanical circuit breaker, the static circuit breaker and the hybrid circuit breaker.

The first type of circuit breaker, the electromechanical circuit breaker, is today used in most of the feeding stations and rail vehicles in traction systems.

This type has, howev r, sev ral inconveniences such as high wear, high noise level, a relativ ly long reaction tim , high maint nance costs, etc.

The static circuit breaker has been the object of numerous tests, studies and realisations on a laboratory scale but the high dissipation during normal operation makes it unusable for commercial exploitation.

The last type of circuit breaker, the hybrid breaker, has its name from th combination of an electromechanical system and power electronics. During normal working conditions the current is conducted through a mechanical connector having very low losses. When activated the mechanical connector disconnects and the current is taken over by a static breaker connected in parallel. Once the mechanical connector has completely disconnected the static part is breaking the current through the circuit. Due to the fast operation of th mechanical system and the commutation of the current the arc created over the mechanical contacts is limited.

Several different realisatons are possible. One known solution uses the injection of current in the opposite direction of the short circuit current by means of the discharge of a capacitor. This type has been the object of numerous tests and realisations. Its complexity, price and lack of reliability have, however, prevent d its commercial success.

BRIEF DESCRIPTION OF THE INVENTION

One object of the present invention is to provide an electrical coil module of planar type preferably manufactured by means of printed circuit techniques on a generally flat substrate.

It is a further object of the invention to provide an extremely thin and compact electrical coil making us of such coil modules which is especially advantageous as a driving means in a so called Thomson mechanism forming part of a circuit breaker. This type of coil has also other applications.

A further object of the present invention is to provide a circuit breaker of the hybrid type which is extremely fast and efficient.

An advantageous embodiment of the circuit breaker is characterised by a new design of the eletromechanical actuation mechanism and an especially compact and symmetrical design of the static part of the breaker.

An important advantage with the circuit breaker according to the invention is that the dissipation is extremely low. The noise level when actuated is also very low. The new design of the actuation mechanism for the mechanical contact has increased the speed of the mechanism and made it very compact. Reliability and life time of the breaker are excellent.

BRIEF DESCRIPTION OF THE FIGURES

Other objects, uses and advantages of this invention will be apparent from the reading of this description which proceeds with reference to the accompanying drawings forming part thereof and wherein.

DETAILED DESCRIPTION OF THE INVENTION

Figure 1:
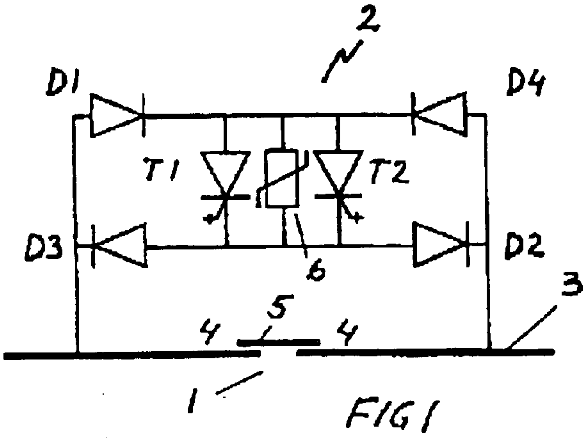
FIG. 1 schematically shows a hybrid circuit breaker according to the present invention, FIG. 2 schematically shows the electromechanical part of the circuit breaker.

FIG. 1 shows schematically and in a general way a circuit breaker according to the present invention. A normally closed mechanical contact 1 in the main circuit 3 is carrying the current during normal conditions. The contact 1 comprises fixed contact elements 4 and a mobile contact element 5. A static circuit breaker, generally designated 2 is connected in parallel to the contact 1. The current through the mechanical contact could flow in either direction at the moment when the circuit breaker is activated. The static part is therefore symmetrical to be able to take over and break the current in case of e.g. a short circuit in the main circuit 3.

Figure 7:
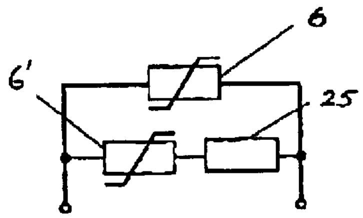
FIG. 7 shows a MOV—resistor combination efficient to reduce the cost of the MOV by distributing the energy.

The static part 2 of the circuit breaker comprises a diode bridge D1–D4 making the breaker work for both directions of the current In the main circuit 3. The active part of the breaker comprises at least one thyristor of the type IGCT (Integrated Gate Commutated Thyristor). The described embodiment uses two IGCTs T1, T2 connected in parallel between which the current is partitioned. This design and its components make it possible to break currents of the order of 6 kA without the necessity of special precautions like help circuits for the commutation, static and dynamic balancing of the currents, matching the component etc. This value of the current is of course not to be interpreted as a limitation in any direction. By means of an appropriate choice of the components circuit breakers for higher as well as lower nominal current values can of course be designed according to the same principles. A MOV (Metal Oxide Varistor) 6 connected in parallel to the IGCTs is used to limit the voltage over the devices when the IGCTs are opening and to dissipate the inductive energy of the main circuit 3. Alternatively the MOV 6 connected in parallel with the IGCTs can be combined with an additional parallel branch including a second MOV 6' having a resistor 25 in series in order to reduce the energy dissipated in the MOV 6. This arrangement is shown in FIG. 7. The MOV 6' must have a withstand-voltage value close to the feeder voltage.

Figure 2:
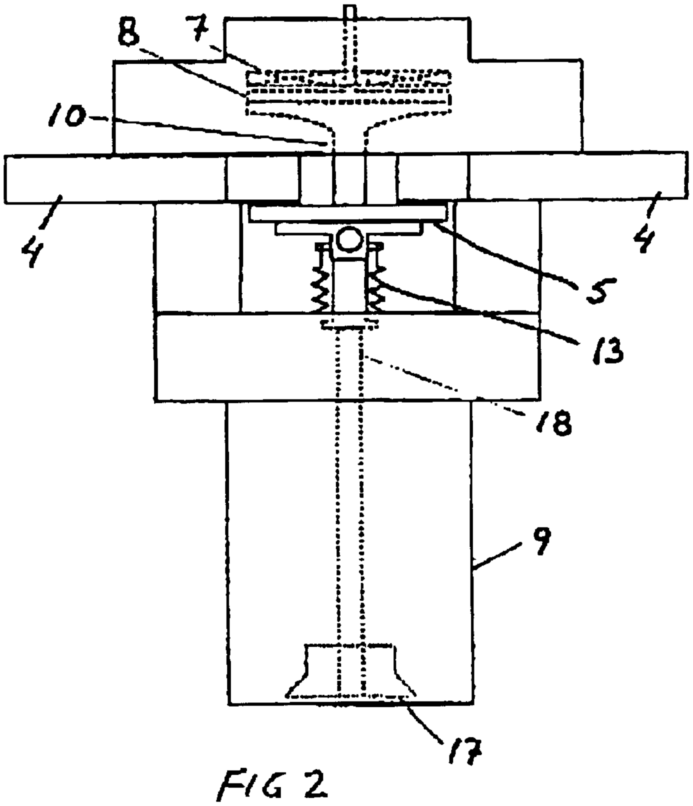

In reality the mechanical contact 1 is controlled by means of a very fast actuating mechanism e.g. of the Thomson type. FIG. 2 shows such a mechanism and the contact 1. The mechanism uses electrodynamic repulsion between two electrical currents circulating in the opposite directions in a coil 7 and a disk 8 to create the needed physical movement. Under normal conducting conditions the contact 1 is secured by means of magnetic means 9. The mechanism also includes damping means for the mechanical movement (not shown) preferably arranged below the magnetic means 9. The mechanism will be further described below.

During normal operation the mechanical contact 1 is closed and the current in the main circuit 3 passes the contact without creating any excessive thermal effect.

A short circuit somewhere in the main circuit 3 could considerably increase the current over nominal values which could of course damage components and equipment in the circuit. In order to minimise the effect of such a short circuit it would therefore be of interest to completely break the current as quickly as possible.

Detection means (not shown) are arranged in the circuit to detect an increase of the current which could be due to e.g. a short circuit. Co-operating control means (not shown) sands a signal to the actuation means of the mechanical breaker. A signal is also sent to the gates of the thyristors T1, T2 to activate the same. If the contact element 5 at the breaking instant is opening symmetrically, i.e. if the element is creating two spark gaps at the same time, one at each end portion of the element 5, two sparks appear between the mobile contact element 5 and the fixed contact elements 4. The voltages related to these sparks which could be in the order of 2×20 V allows the current to commutate to the static part 2 of the breaker relatively fast (in the order of 50 microseconds). The air in th two gaps is ionised due to the arcs which means that the dielectric properties of the gaps are deteriorating. As a consequence it will be necessary to wait until the air has de-ionised and cooled down before the IGCTs are turned off otherwise there is a risk that the high voltage (e.g. 3 kV) will generate new arcs. across the contact elements.

In the alternative th element 5 could be given a movement such that it opens unsymmetrically, i.e. to start with only one spark gap is created at the breaking instant. Thus only one spark appears at one end portion of th element 5. The current will in this case commutate slower (e.g. 100 microseconds). The advantage with this alternative is that the air will not be ionised at the end portion of the contact element 5 where no spark is created during the commutation and the overall dielectric properties will be much better which means that the delay before the IGCTs are turned off could be made much shorter. The energy dissipated in the volume of air between the contact elements 4, 5 is very low due to the fat that the current rapidly decreases. The high speed of the separation of the contact elements also favours the replacement of air in said volume which contributes to a good cooling. Additionally the evaporaton of metal from the contact elements is negligible compared to the case with an electomechanical breaker.

The speed of the commutation is mainly dependent on the geometry of the connections of the static cell and the voltage over the conducting semiconductors.

Figure 5:
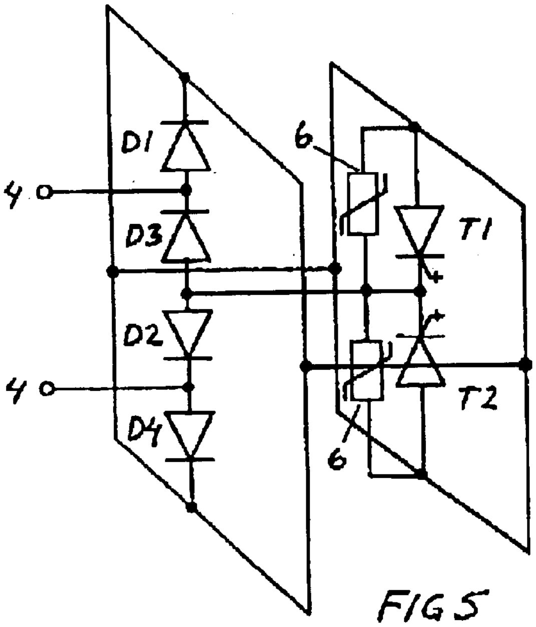
FIG. 5 shows the electrical and mechanical arrangement of the components of the static part of the circuit breaker.
Figure 6:
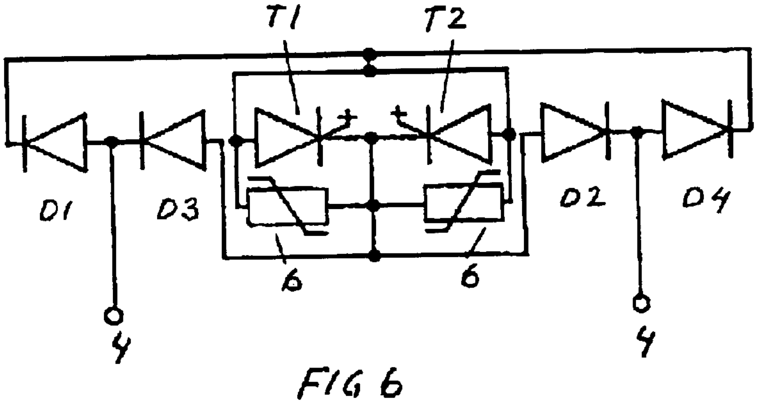
FIG. 6 shows another electrical and mechanical arrangement of the components of the static part of the circuit breaker.

The parallel connection of the two IGCTs T1, T2 requires a perfect symmetry in the geometry of the bus barn which leads to symmetrical stray inductances. The diodes D1, D2, D3, D4 and the IGCTs T1, T2 need a mounting which exercises mechanical pressure P1 and P2 on the components. If the pressure needed for the diodes P1 is different than that for the IGCTs, P2, the mechanical assembly can be arranged as represented in FIG. 5 with two separate stacks of components. If the same pressure P3 is required, the arrangement of FIG. 6 with one single stack can be adopted. In both FIG. 5 and FIG. 6, the current paths (and so the stray inductances) are exactly the same for the two IGCTs connected in parallel.

When the current has completely commutated to the semiconductors the br ak r has to wait until the contacts are sufficiently separated before the static interruption is started. It is necessary that the isolation distance between th mechanical contact elements is sufficient to guarantee that no arcing reappears.

The interruption of the current in the respective IGCT is almost instantaneous. The current is thus passing the MOV 6 and decreases rapidly. The time between the detection of a short circuit and the start of the decrease of the current is about 350 microseconds which is about 15 to 20 times as fast as for eletromechanical breakers. The power semiconductors are typically capable of interrupting several thousands of amperes in a time less than two microseconds. Taking this into account it is clear that in order to profit from this characteristic it is necessary to reduce the opening time for the mobile contact In order to reduce the opening time for the contact 1 a system with electrodynamic propulsion is used as described above. The mechanical part of is the hybrid breaker comprises three distinct units, the mobile contact 5, the magnetic locking mechanism 9 and the actuator 7, 8, 10. The actuator giving the electrodynamic propulsion is in the described example of the previously known Thomson type.

Such an actuator is illustrated schematically in FIGS. 2 and 9. The mobile contact 5 has in the illustrated embodiment of the invention been given a pivoting movement in order to reduce the displaced mass in the operation.

An arrangement of the moving contact for pivoting movement is shown in FIG. 9. The moving contact 5 has been mounted on an arm 11 pivoting around a pin 12. The arm is preferably spring loaded by means springs 13 keeping the arm in contact with the end portion of the shaft 14 of the locking mechanism 9.

Figure 8:
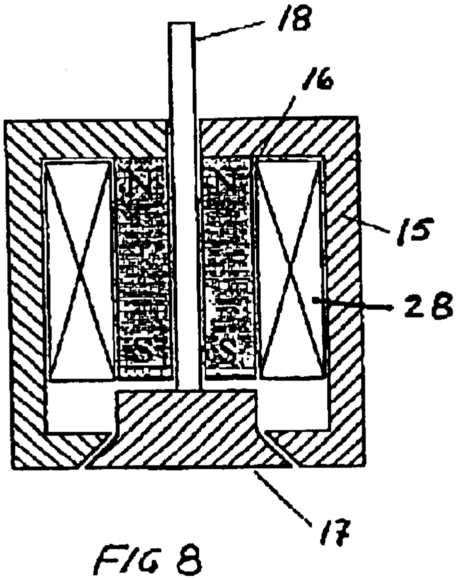
FIG. 8 schematically shows the locking mechanism of the electromechanical part of the circuit breaker.

In order to evacuate the heat produced at the contact lements 4, 5 the mass of the fixed contact elem nts 4 have delib rately been chosen important. The magnetic locking mechanism 9 which is illustrated more in detail in FIG. 8 allows the closing and opening of the circuit breaker and the application of a constant force between the contact elements in the closed position in order to decrease the electrical resistance. The locking mechanism comprises an electro-magnet 15 with a, mobile iron core and a permanent magnet 16. The locking mechanism is closed by injecting a current in the coil 28 from an auxiliary DC source. This creates a magnetic flux in the iron circuit. The flux generates a moving force that makes the iron core 17 move towards the permanent magnet 16. The flux also magnetises the permanent magnet, allowing a permanent force that maintains the core in the closed position.

The mobile core 17 of the magnetic locking mechanism has been designed as light as possible in order to decrease the total mass. A shaft 18 transmits the resulting movement to the mobile contact 5.

The opening of the electrical contact 4, 5 can be achieved in two different ways in an emergency case, e.g. at a short circuit, the contact can be opened by means of the actuator, e.g. of the Thomson type, as described below. In this case the forces generated by the actuator will release the locking mechanism 9 despite the fact that this mechanism is still magnet. The contact 4, 5 can also be deliberately opened by demagnetising the locking mechanism.

Figure 9A:
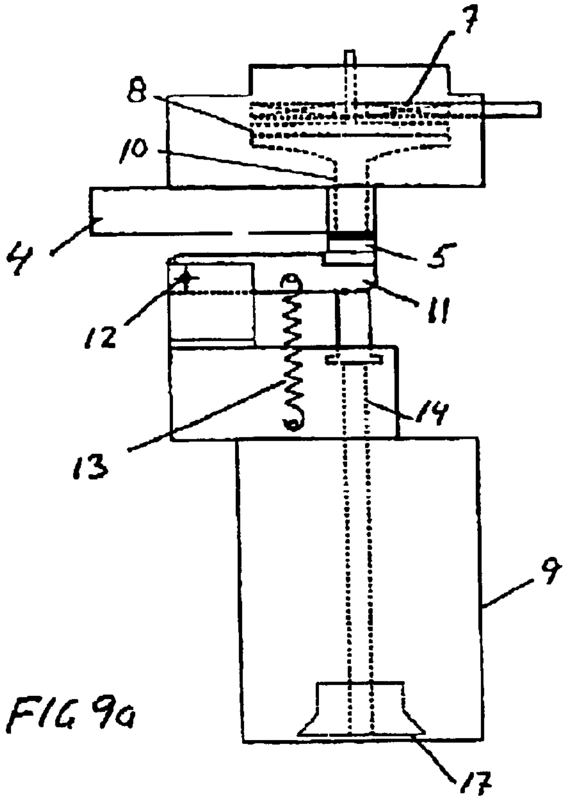
FIG. 9*a* and 9*b* show side views of the contact and drive mechanism of one embodiment of the invention.
Figure 9B:
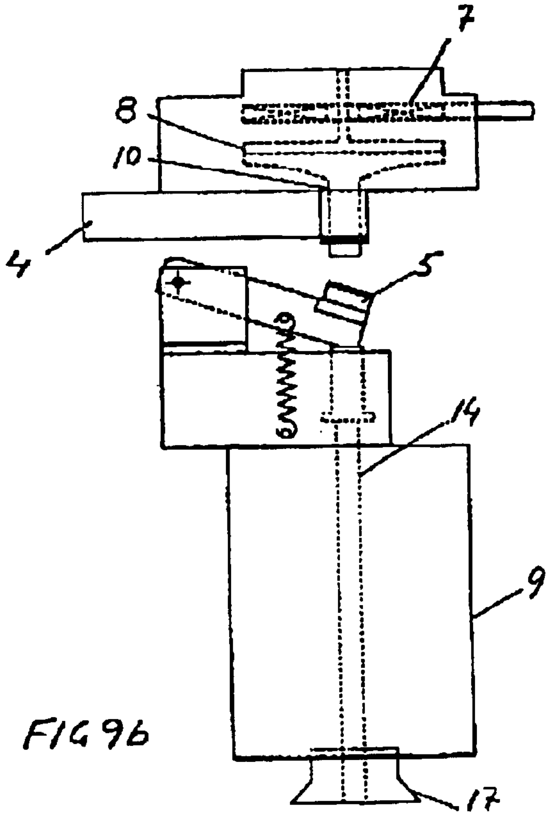

The springs 13 shown in FIGS. 2, 9*a* and 9*b* are keeping the contact in the open position after an opening by means of the actuator. As mentioned above the locking mechanism has not been demagnetised in that case and e.g. a mechanical shock could under circumstances re-close the contact in the closed position the force generated by the magnet is much stronger than the force from the spring.

A damping arrangement (not shown) decelerates the moving masses after the opening of the contact in this particular case a special plastic foam material positioned below the locking mechanism has been used which gives excellent absorption characteristics but of course many other types of chock absorbing arrangements could be envisaged alone or in combination, for example pneumatic or hydraulic types of damping.

The Thomson type actuator comprises a coil 7 in which is circulated a very strong current in pulse form (in one embodiment of the invention a current in the order of 15 kA, top value has been used). This current could for instance be generated by means of a battery of electrolytic capacitors controlled by a diode-thyristor arrangement A disk 8 of copper or similar is positioned just below the coil. By means of induction a counter current is generated in the disk when the coil is energised. The top value of this induced current could in the same embodiment reach a value of 80 kA. Due to these two currents a violent repulsion effect is created between the coil 7 and the mobile disk 8 which will move the disk and the mobile element 5 of the mechanical contact 1 actuated by the shaft 10 fixed to the disk 8.

In an especially advantageous embodiment of the invention a special type of coil is used. This coil comprises a number of superimposed coil modules 19 of planar type which could be manufactured by means of e.g. printed circuit techniques. These modules are superimposed to give the appropriate characteristics for the coil. One advantage with this type of design of the actuating coil of the Thomson mechanism Is that the coil 7 can be made extremely thin in the direction perpendicular to the surface of the disk 8 which means that the two opposite currents in the coil and the disk are brought close together which considerably increases the repulsive effect between the coil 7 and the disk 8. This will of course decrease the reaction time of the mechanism.

Figure 3A:
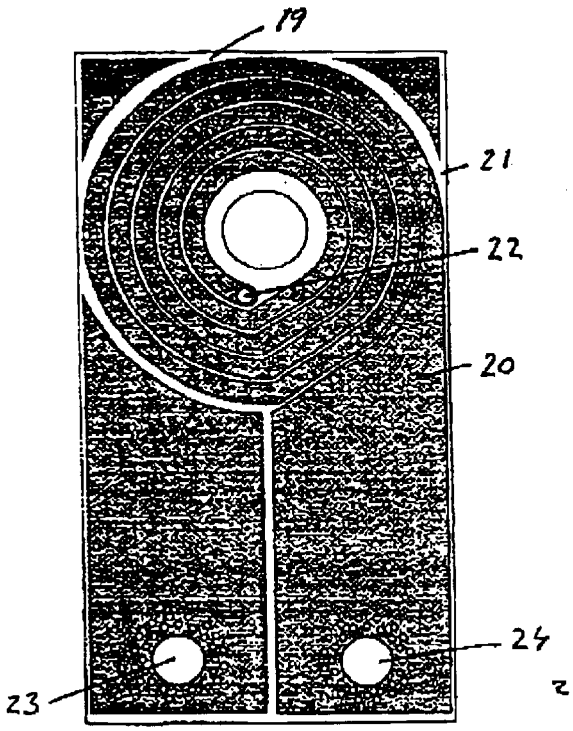
FIG. 3*a* and 3*b* show different views of a coil module of planar type forming part of a first embodiment of the coil in the drive mechanism of the electromechanical part of the circuit breaker.
Figure 3B:
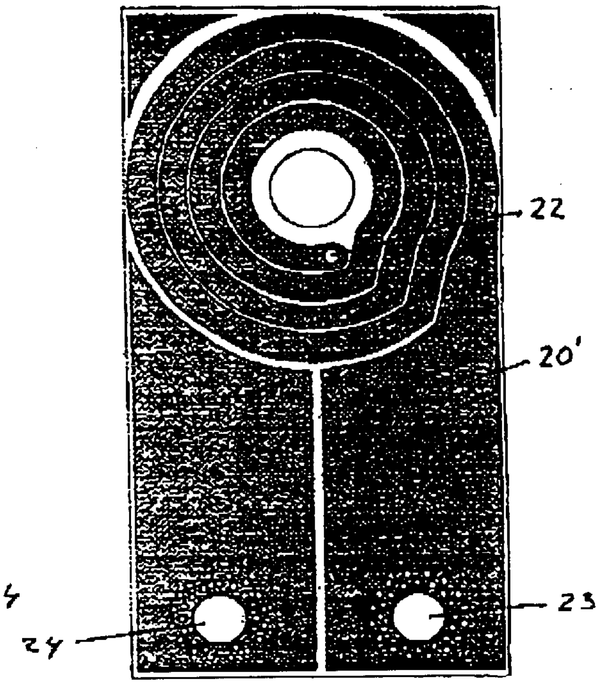
Figure 3C:
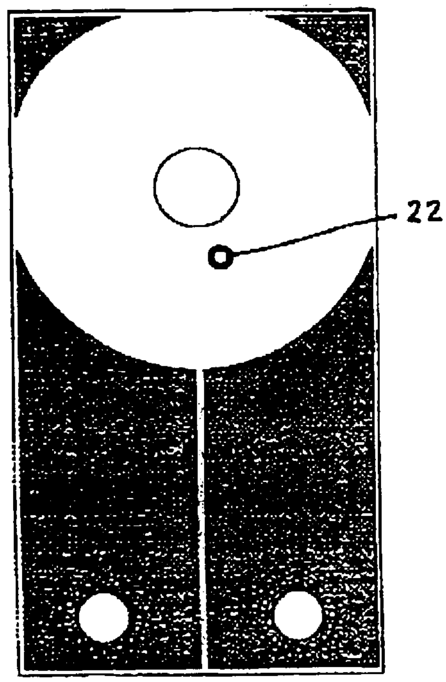
FIG. 3*c* shows an isolating element to be placed between two successive coil modules according to FIGS. 3*a* and 3*b,*

A first embodiment of a module for such a coil is shown in FIGS. 3*a* and 3*b*. By means of known techniques a first layout of conducting material 20, e.g. copper, is created on one side of a substrate 21. On the opposite side of the same substrate a second layout 20' is created. FIG. 3*a* shows one side of the module and FIG. 3*b* the other side. The conductor on each side of the substrate is communicating to the conductor on the other side by means of an electrical connection through the substrate. Such an electrical connection could e.g. have the form of the metallized walls of a through hole 22. If thus e.g. the hole 23 is considered to be the input to the module the current will flow via the conducting material 20' to the hole 22 which conducts to the other side of the substrate. The current will then follow the conductor on the other side to the output 24. A number of such modules could be superimposed and clamped together to create a flat and very compact coil. In this embodiment successive modules have to be separated by means of an isolation element as illustrated in FIG. 3*c*. The holes 23, 24 and 22 can all three conduct current between the two sides of the substrate via the metallized wall in the respective hole.

It is evident that when stacking such modules and isolation elements th modules will be electrically connected in parallel. A suitable number of modules are put together to give the desired characteristic of the coil.

The skin effect which has to be considered in high frequency and pulse mod will create much less problems than in the case of an ordinary coil which means that the conductor section of the coil according to the invention will be more efficiently used. In a particular embodiment the total copper section is divided in about ten very thin slices due to the planar design of the coil. In such a case, the total copper section will be carrying the current.

Figure 4A:
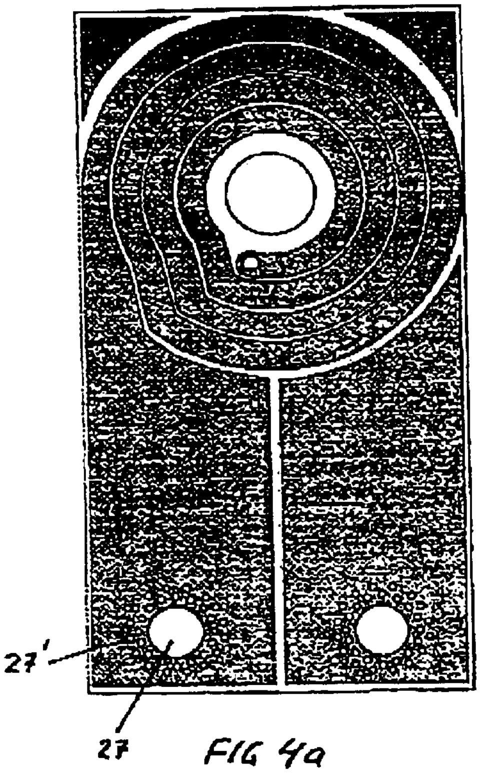
FIG. 4*a*–4*d* show different views of two coil modules of planar type forming part of a second embodiment of the coil in the drive mechanism of the electromechanical part of the circuit breaker.
Figure 4C:
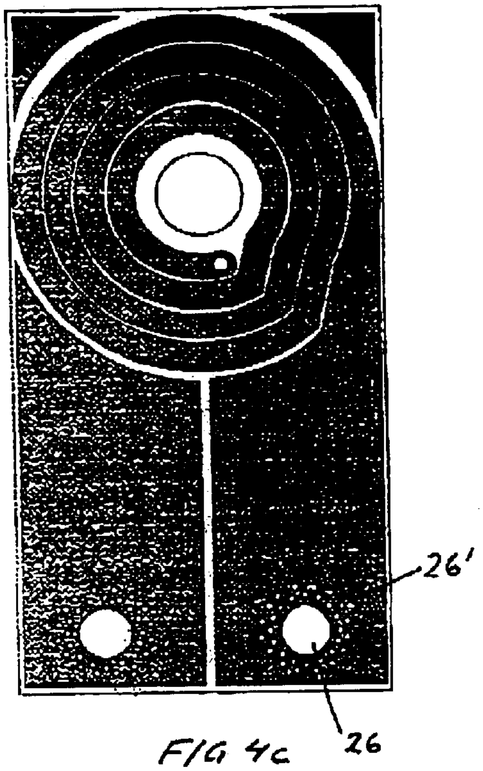
Figure 4B:
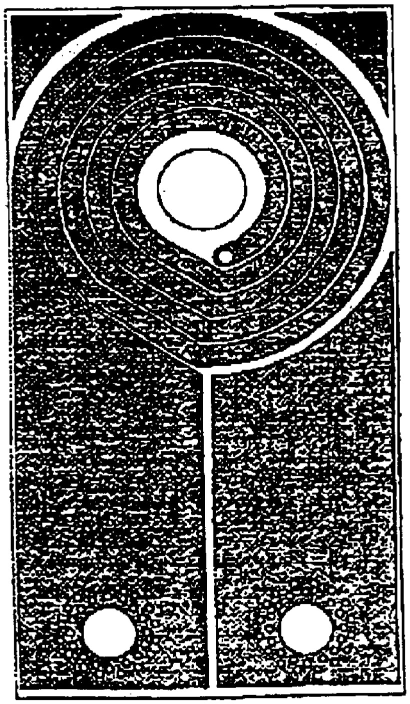
Figure 4D:
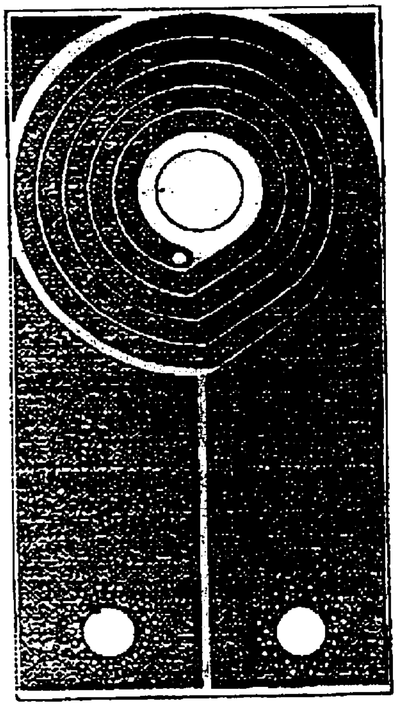

FIG. 4*a*–4*d* show different views of two coil modules of planar type forming part of a second embodiment of a coil which e.g. can be used in the drive mechanism of the electromechanical part of a circuit breaker. FIG. 4*a* and 4*b* and FIG. 4*c* and 4*d* show the opposite sides of two coil modules respectively. Thus, if we define FIG. 4*a* as the upper side of the first type of module then FIG. 4*b* is the lower side of the same module. Then FIG. 4*d* will be the upper side and FIG. 4*c* the lower side of the second type of module. The layout of the lower side of the first type of module, FIG. 4*b*, and the upper side of the second type of module, FIG. 4*d*, are mirrored versions of each other as can be seen. The same goes for the layout of the upper side of the first type of module, FIG. 4*a*, and the lower side of the second type of module, FIG. 4*c* The advantage of this arrangement is that if you alternate the type of modules when the coil is put together there does not have to be any isolation in between the coil modules. Short circuit of the coil windings is impossible. Thus, for given electrical characteristics the coil can be made even thinner by means of this second embodiment of the invention.

In an area around the Input and output terminals 26 and 27 respectively of a coil module a number of smaller through holes 26' and 27' respectively have been arranged. The metallized walls of these holes are contributing to the conductive section between the two sides of the module.

What is claimed is:

1. An electrical coil module, comprising:

a generally flat substrate (21) having an upper surface and a lower surface;

a first layout (20) of conducting material constituting a first electrical conductor having an input terminal (23), is arranged on the upper surface of said substrate (21), a second layout (20') of conducting material constituting a second electrical conductor having an output terminal (24), is arranged on the opposite lower surface of said substrate, said first and second conductors are connected by a third electrical connection (22) through the substrate (21), so that an electrical voltage connected between the input and output terminals of the coil module will drive a current from one terminal through the conductor on one side of the substrate via the third connection (22) through the substrate and the conductor on the other side of the substrate to the other terminal.

2. A pair of coil modules according to claim 1 defining a first and a second module, wherein, one side of the first module is provided with a layout of conducting material which is a mirrored version of the layout of the conducting material of one side of the second module, the other side of the first module is provided with a layout of conducting material which is a mirrored version of the layout of the conducting material of the other side of the second module.

3. An electrical coil comprising at least two coil modules according to claim 1, wherein, said modules are superimposed and clamped together to create a flat coil in which the respective coil modules are electrically connected in parallel.

4. An electrical coil according to claim 3, wherein, said modules are separated by means of an isolation element.

5. An electrical coil according to claim 2, wherein, the coil comprises at least one pair of modules, said modules are superimposed without intermediate isolation element.

6. An actuation mechanism of the Thompson type comprising an energising coil (7), a co-operating disk (8) and a shaft (10) transferring the movement of the disk (8), wherein said coil is of the type defined in claim 3.

7. An electromechanical circuit breaker comprising an actuation mechanism of the Thompson type, a pair of fixed contact elements (4) and a moving contact element (5), wherein said actuation mechanism is of the type defined in claim 6.

8. An electromechanical circuit breaker according to claim 7, wherein, said moving contact element (5) is arranged on a pivoting arm (11).

9. A hybrid circuit breaker comprising an electromechanical circuit breaker according to claim 7 and a static circuit breaker connected in parallel, wherein, said static circuit breaker comprises a diode bridge (D1–D4) connected in parallel over the mechanical contacts (4, 5) of the electromechanical circuit breaker the diagonal of which bridge is including at least one IGCT type thyristor (T1, T2) connected in parallel with a MOV (6).

10. A hybrid circuit breaker according to claim 9, wherein a second MOV (6') in series with a resistor (25) is connected in parallel with said MOV (6).

11. An electrical coil, comprising:

a first and a second modules, each of the first and second modules comprising a generally flat substrate (21);

a first layout (20) of conducting material constituting a first electrical conductor having an input terminal (23), the first layout arranged on one side of said substrate (21);

a second layout (20') of conducting material constituting a second electrical conductor having an output terminal (24), the second layout arranged on the opposite side of said substrate, said first and second conductors connected by a third electrical connection (22) through the substrate (21) so that an electrical voltage connected between the input and output terminals of the coil module will drive a current from one terminal through the conductor on one side of the substrate via the third electrical connection (22) through the substrate and the conductor on the other side of the substrate to the other terminal, wherein, one side of the first module is provided with a layout of conducting material which is a mirrored version of the layout of the conducting material of one side of the second module, the other side of the first module is provided with a layout of conducting material which is a mirrored version of the layout of the conducting material of the other side of the second module, and the first and second modules are superimposed and clamped together to create a flat coil in which the respective coil modules are electrically connected in parallel.

12. An electrical coil according to claim 11, wherein, said modules are separated by an isolation element.

13. An electrical coil according to claim 11, wherein, said modules are superimposed without intermediate isolation element.

14. An actuation mechanism of the Thompson type comprising an energising coil (7), a co-operating disk (8) and a shaft (10) transferring the movement of the disk (8) wherein said coil is of the type defined in claim 11.

15. An electromechanical circuit breaker comprising an actuation mechanism of the Thompson type, a pair of fixed contact elements (4) and a moving contact element (5), wherein said actuation mechanism is of the type defined in claim 14.

16. An electromechanical circuit breaker according to claim 15, wherein said moving contact element (5) is arranged on a pivoting arm (11).

17. A hybrid circuit breaker comprising an electromechanical circuit breaker according to claim 15 and a static circuit breaker connected in parallel, wherein said static circuit breaker comprises a diode bridge (D1–D4) connected in parallel over the mechanical contacts (4, 5) of the electromechanical circuit breaker the diagonal of which bridge is including at least one IGCT type thyristor (T1, T2) connected in parallel with a MOV (6).

18. A hybrid circuit breaker according to claim 17, wherein a second MOV (6') in series with a resistor (25) is connected in parallel with said MOV (6).

19. An electrical coil, comprising:

a first and a second modules, each of the first and second modules comprising a generally flat substrate (21);

a first layout (20) of conducting material constituting a first electrical conductor having an input terminal (23), the first layout arranged on one side of said substrate (21);

a second layout (20') of conducting material constituting a second electrical conductor having an output terminal (24), the second layout arranged on the opposite side of said substrate, said first and second conductors connected by a third electrical connection (22) through the substrate (21) so that an electrical voltage connected between the input and output terminals of the coil module will drive a current from one terminal through the conductor on one side of the substrate via the third electrical connection (22) through the substrate and the conductor on the other side of the substrate to the other terminal, wherein, the first and second modules are superimposed and clamped together to create a flat coil in which the respective coil modules are electrically connected in parallel.

20. The electrical coil of claim 19, wherein, one side of the first module is provided with a layout of conducting material which is a mirrored version of the layout of the conducting material of one side of the second module, the other side of the first module is provided with a layout of conducting material which is a mirrored version of the layout of the conducting material of the other side of the second module.

* * * * *